United States Patent [19]
Williams et al.

[11] 4,438,957
[45] Mar. 27, 1984

[54] CONSTANT MOTION SWIVEL JOINT

[75] Inventors: Michael R. Williams, Houston; Albert R. Tucker, Spring, both of Tex.

[73] Assignee: FMC Corporation, Chicago, Ill.

[21] Appl. No.: 243,169

[22] Filed: Mar. 12, 1981

[30] Foreign Application Priority Data

Apr. 1, 1980 [GB] United Kingdom ............... 8010878

[51] Int. Cl.³ ............................................. F16L 27/00
[52] U.S. Cl. .................................... 285/223; 277/125; 285/281
[58] Field of Search ............... 285/281, 223, 49; 277/125, 105, 228, 235 A

[56] References Cited

U.S. PATENT DOCUMENTS

| | | | |
|---|---|---|---|
| 1,165,876 | 12/1915 | Heberling | 285/281 X |
| 1,971,169 | 8/1934 | Wheeler | 277/125 X |
| 2,075,019 | 3/1937 | Buck et al. | 277/125 X |
| 2,963,304 | 12/1960 | Comlossy, Jr. et al. | 285/281 X |
| 3,022,081 | 2/1962 | Kosatka | 277/153 X |
| 3,316,940 | 5/1967 | Gratzmuller | 277/125 X |
| 3,679,235 | 7/1972 | Faccou | 285/281 X |
| 4,076,284 | 2/1978 | Herbert et al. | 285/223 X |
| 4,121,861 | 10/1978 | Gorndt | 285/223 |
| 4,234,197 | 11/1980 | Amancharla | 277/125 X |
| 4,236,737 | 12/1980 | Herbert et al. | 285/281 X |

Primary Examiner—Thomas F. Callaghan
Attorney, Agent, or Firm—L. B. Guernsey; W. W. Ritt, Jr.; R. B. Megley

[57] ABSTRACT

A constant motion pipe swivel joint having a greatly improved useful life without leakage of fluid from the joint. The swivel joint includes a plurality of sealing discs rotatably positioned between an outer joint member and an inner joint member. One side of each disc is coated with a material having a low coefficient of friction and the other side of each disc is bonded to a layer of elastomeric material such as rubber. The discs are pressed together by the inner and outer members to provide a seal which prevents leakage of fluid from the joint. The rubber stretches to allow small degrees of rotation of the joint without any slippage of one disc over another, and the surfaces of the discs are free to slip over each other to allow a large amount of rotation of the outer joint member relative to the inner joint member.

12 Claims, 23 Drawing Figures

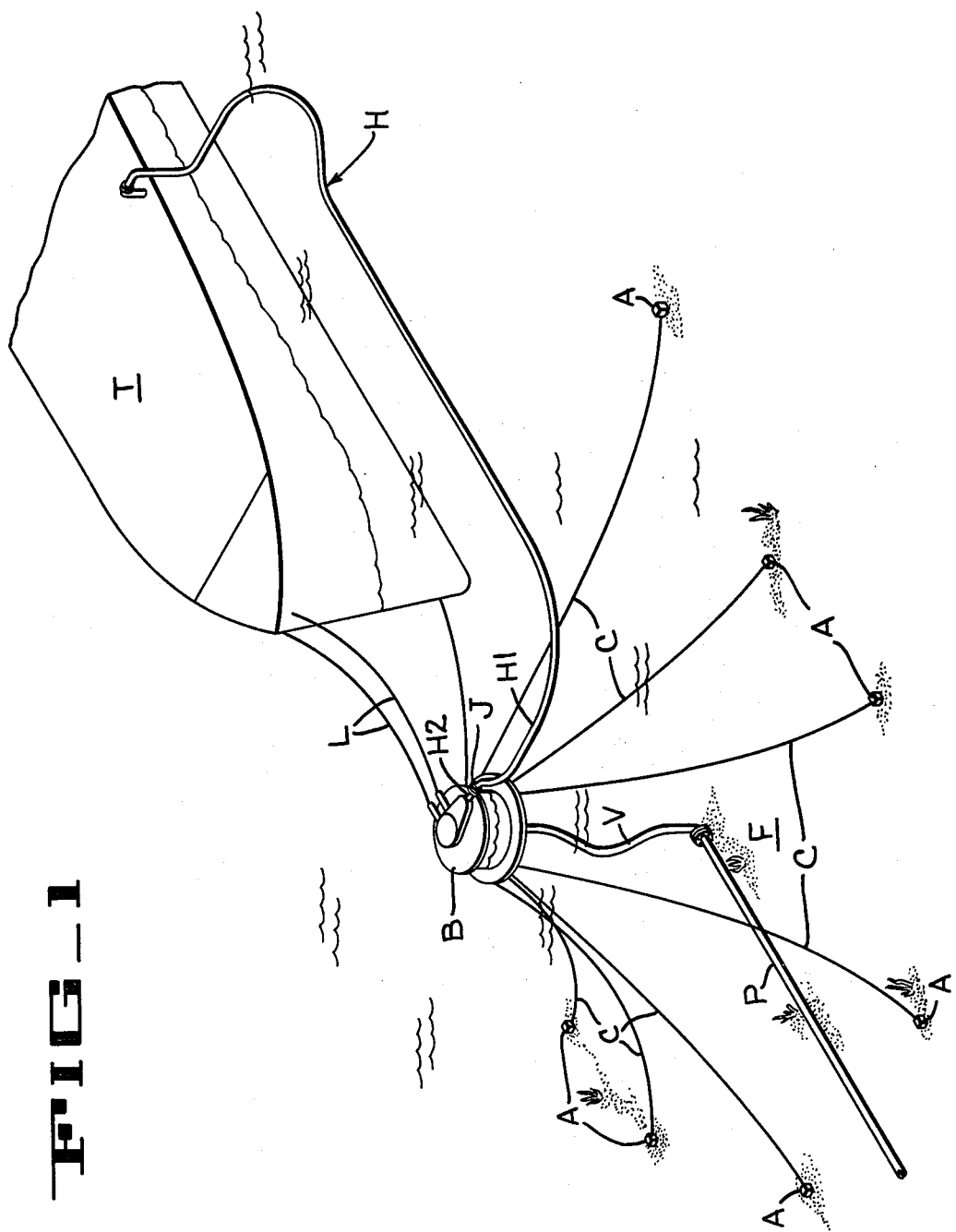
FIG_1

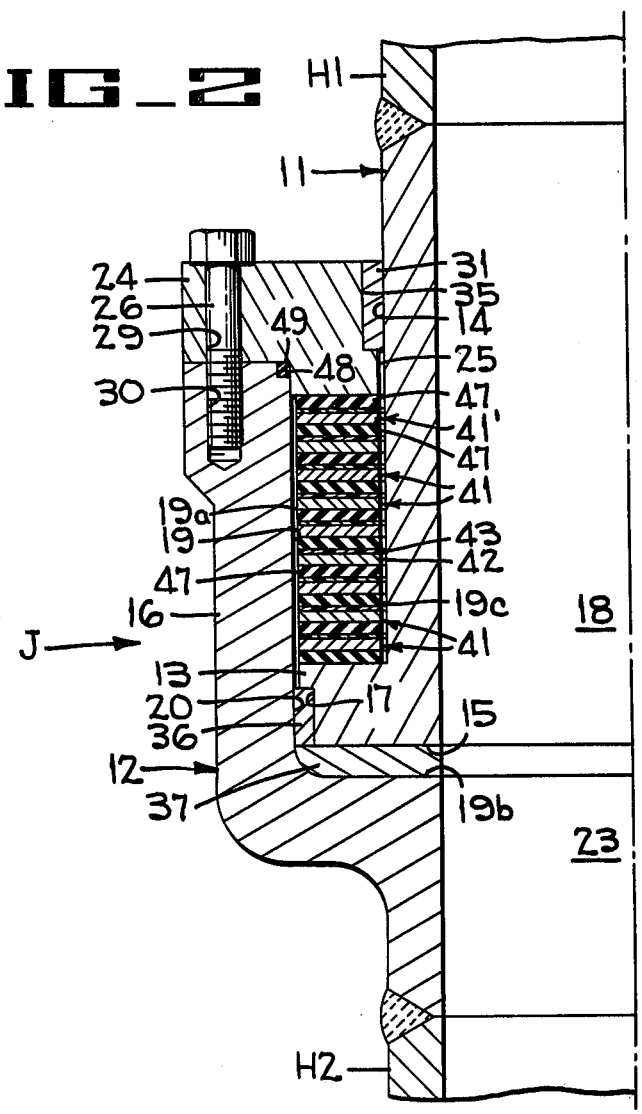
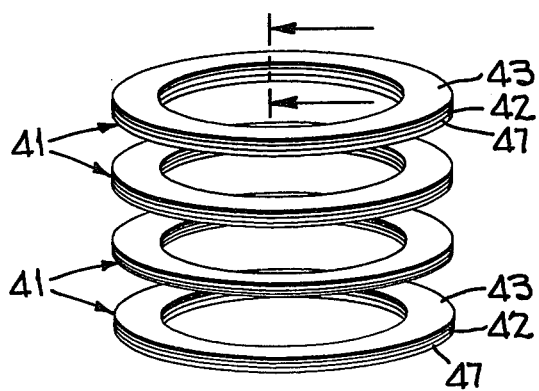

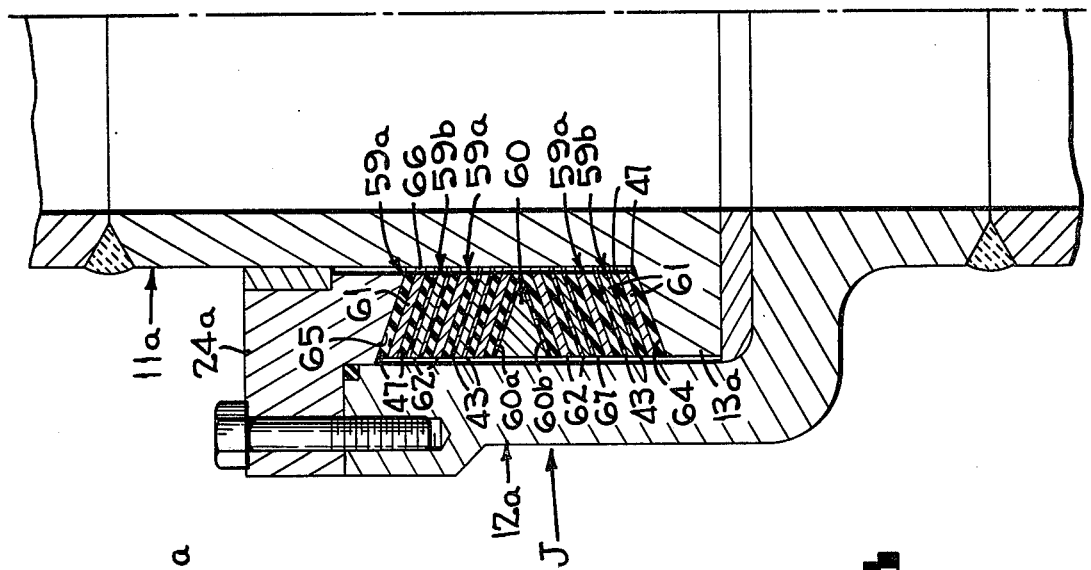
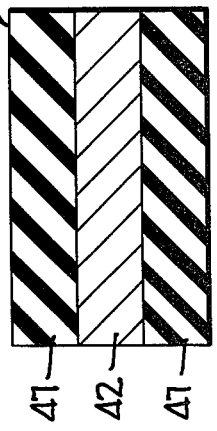
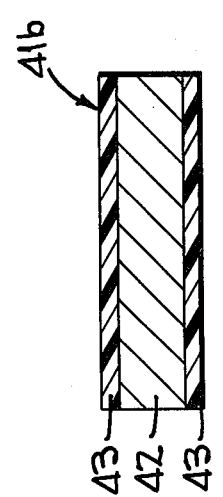
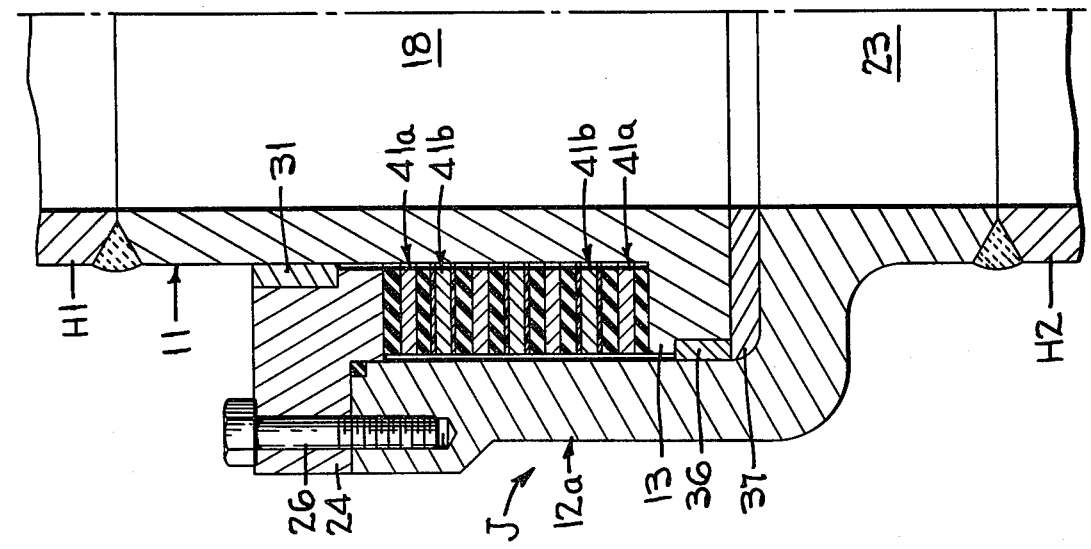

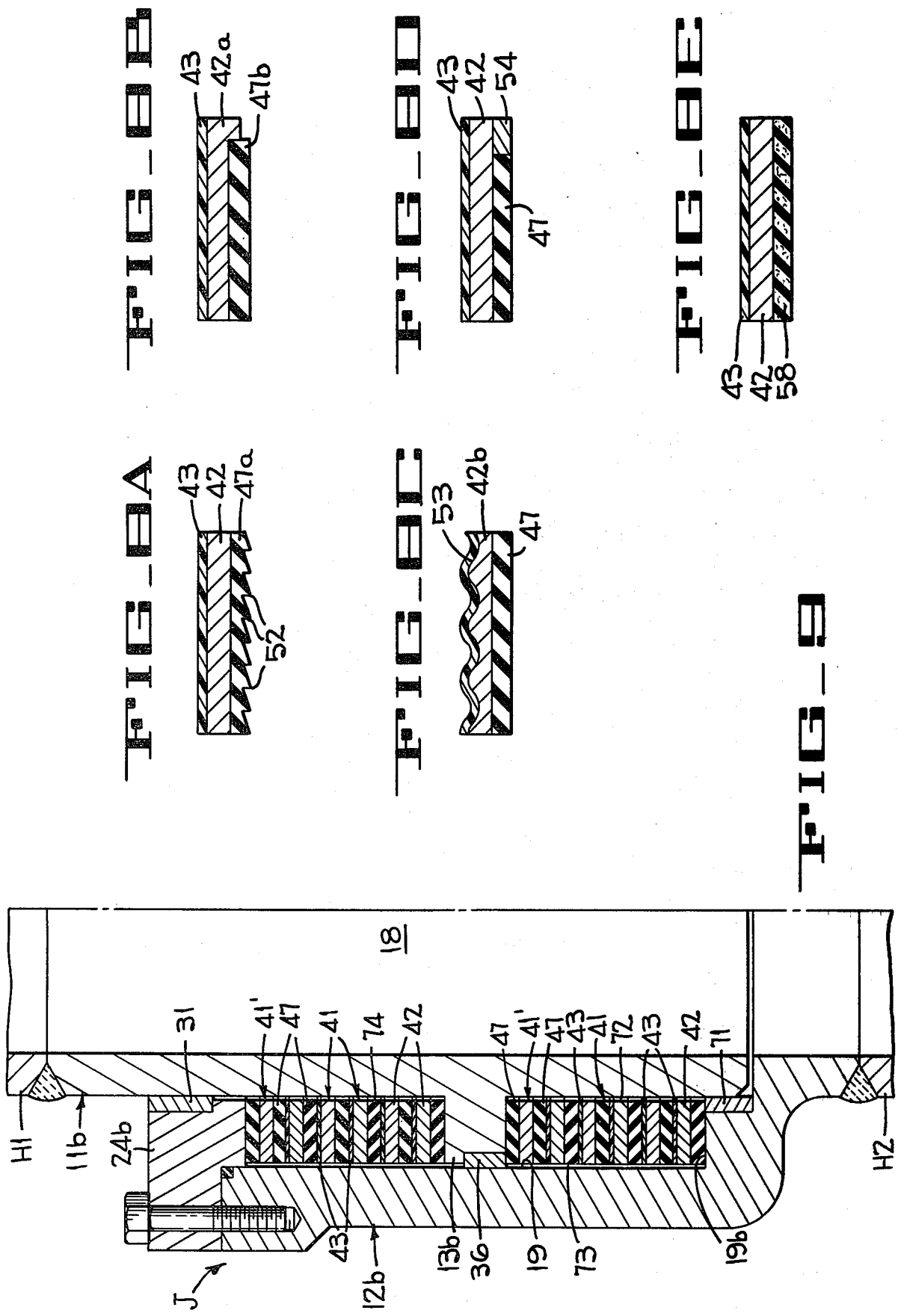

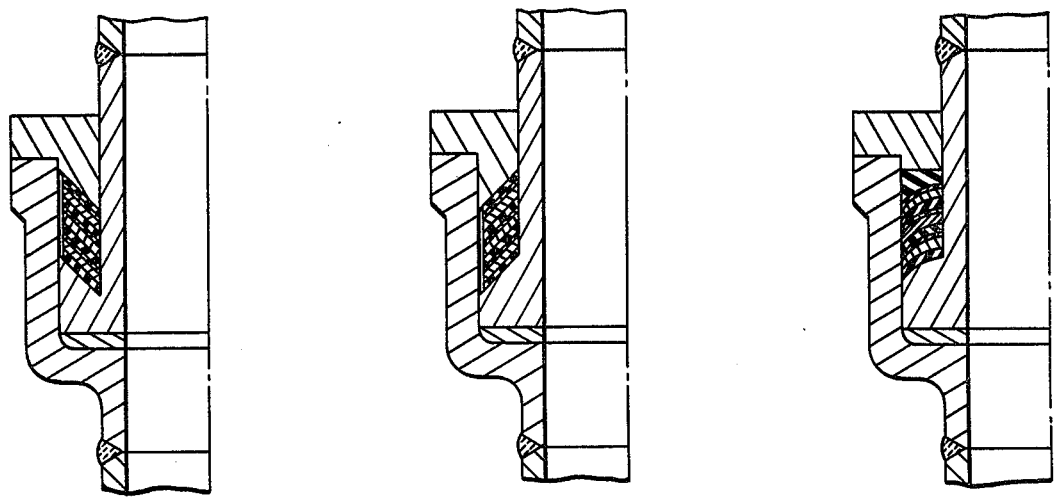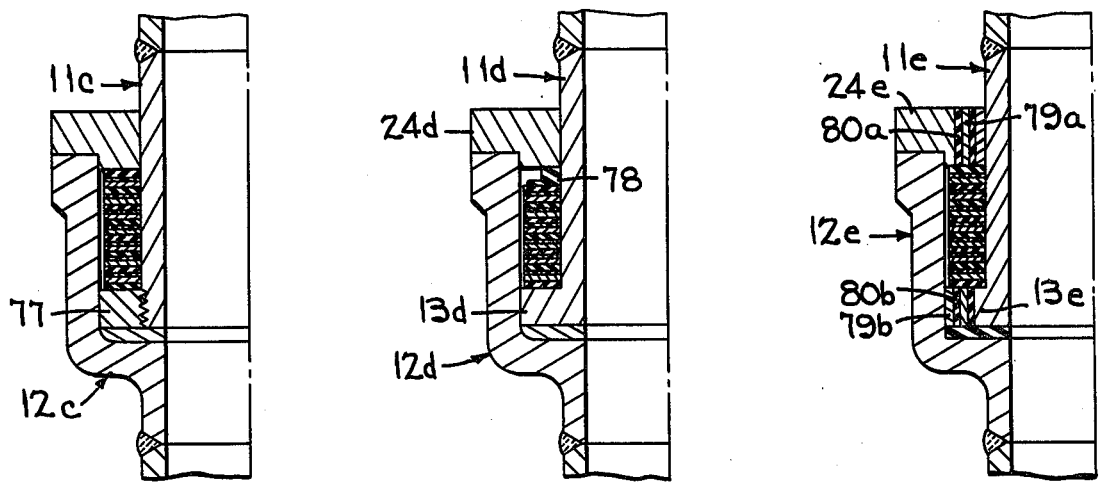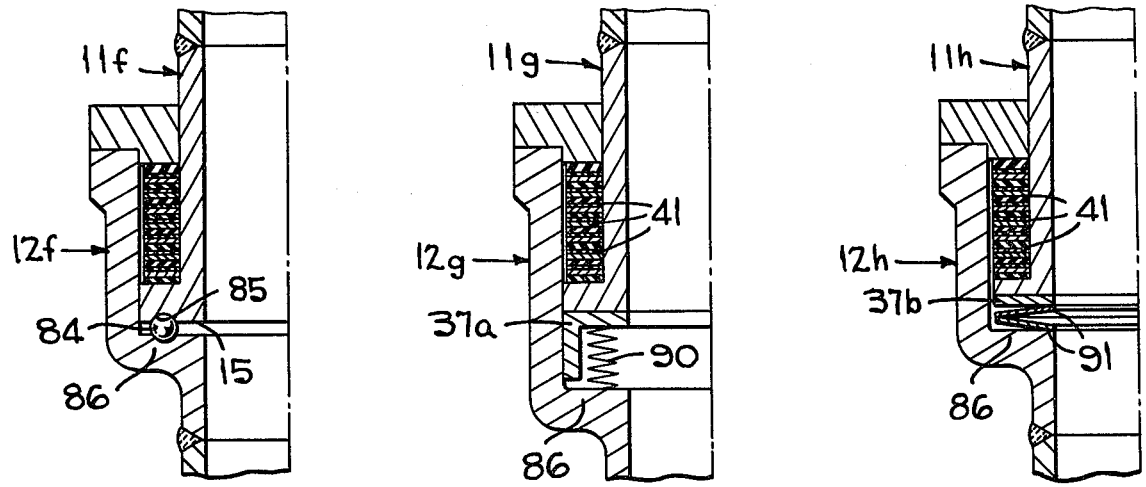

CONSTANT MOTION SWIVEL JOINT

BACKGROUND OF THE INVENTION

1. Field of the Invention

This invention relates to pipe swivel joints, and more particularly to pipe swivel joints especially adapted for use in constant motion service.

2. Description of the Prior Art

A production of oil and gas from offshore wells is a common endeavor in the petroleum industry. A well or cluster of several wells is drilled in the ocean floor and fluid from these wells transported by conduit to marine tankers which transport the fluid to shore facilities. A system of pipelines convey the fluid from the wells to a platform or floating buoy to which a marine tanker may be attached. The pipeline system includes one or more pipes or conduit extending generally horizontally across the ocean floor from the wells to a point below the floating buoy and a generally vertical pipe or hose extending from the buoy to the horizontal pipe. At a plurality of locations in the pipeline system connections are needed between the various pipes. A flexible hose or an articulated loading arm secured between the buoy and the marine tanker may include one or more connections. Some of these connections are used to permit one pipe or hose to rotate relative to an adjacent pipe or hose by the use of swivel joints. Some of the swivel joints include one joint portion which rotates relative to another joint portion on an occasional basis and other swivel joints include a first joint portion which is in almost constant motion relative to another joint portion. One location where a constant motion swivel joint is often used is in the flexible hose extending between the tanker and the buoy anchored to the ocean floor. In prior art swivel joints the seals of the joints wear rapidly due to the constant motion so the joint quite often fails and the seals must be replaced. When the joint is located beneath the surface of the ocean, especially at a great depth, such a replacement of seals is usually difficult and very expensive.

Analysis of the motion of the offshore swivel joints reveals a very large number of small oscillations of approximately 5 degrees or less, superimposed on a small number of large oscillations from 5-20 degrees and in addition, very infrequently a rotation of 360° may occur. Since the majority of the oscillations are small in magnitude, it is seen that a swivel joint which isolates the seals and bearings of the joint from the small oscillations would greatly extend the useful life of such a swivel joint.

SUMMARY OF THE INVENTION

The present invention comprises a constant motion swivel joint for connecting two lengths of pipe in a fluid-tight manner having improved life for the joints' seals. This invention overcomes some of the disadvantages of the prior art by providing a pipe swivel joint comprising a generally cylindrical outer member having an axially extending passage to receive a generally cylindrical inner member, a radially extending flange protruding outward from the cylindrical outer surface of the inner member, a bore extending axially through the inner member, and a plurality of relatively rotatable annular sealing rings mounted between the outer wall of the inner member and the inner wall of the outer member. Each of the sealing rings includes a metal ring having a low friction surface on one side and a layer of elastomeric material bonded to the other side. The sealing rings are compressed between the radial flange on the inner member and a portion of the outer member, with the low friction surface of one ring pressing against the elastomeric material covered surface of an adjacent ring.

The elastomeric material will accommodate small relations of the outer member relative to the inner member without any sliding of one surface over the other, thereby reducing wear of the sealing rings. The low friction surface of the rings will slide over the elastomeric surfaces of adjacent rings when large oscillations of one member occur relative to the other member.

BRIEF DESCRIPTION OF THE DRAWINGS

FIG. 1 is an isometric view of an offshore fluid transfer terminal using one or more swivel joints of the present invention to connect a marine tanker to a subsea pipeline extending to a source of petroleum or other fluid product.

FIG. 2 is a vertical section through the swivel joint of FIG. 1.

FIG. 3 is an exploded isometric drawing of a single bonded disc seal assembly according to the present invention.

FIG. 4 is a vertical section taken along the line 4—4 of FIG. 3.

FIG. 5 is a vertical section through another embodiment of the swivel joint of FIG. 2.

FIGS. 6A, 6B are enlarged vertical sections of the disc seals shown in FIG. 5.

FIG. 7 is a vertical section through a third embodiment of the swivel joint of FIG. 2.

FIGS. 8A–8B are vertical sections of further embodiments of the disc seals which can be used in a constant motion swivel joint of the present invention.

FIG. 9 is an enlarged vertical section of another embodiment of the present invention.

FIGS. 10A–10I show further embodiments of the swivel joints of the present invention.

DESCRIPTION OF THE PREFERRED EMBODIMENT

An offshore fluid transfer system employing the constant motion swivel joint illustrated in detail in FIGS. 2-10 is diagrammatically represented in FIG. 1. This system comprises a submerged pipeline P extending along the ocean floor F from a subsea well or other source of petroleum or other fluid cargo (not shown) to an offshore floating buoy B that functions as a terminal both for mooring and for loading and unloading a marine tanker T. The buoy B is anchored in position by a plurality of chains C that extend between the buoy and a plurality of anchors A that are secured to the ocean floor F. The tanker T is shown secured to the buoy B by a pair of mooring lines L that permit the tanker to swing freely according to the dictates of wind and current, and yet hold the tanker a proper distance from the buoy for loading or unloading through a hose H, the hose comprising a pair of sections H1 and H2. A lower end of a flexible vertical hose V is connected to the horizontal pipeline P and the upper end of the hose V is connected to a swivel (not shown) in the buoy B to allow the tanker to move a full 360 degrees about the buoy B. A constant motion swivel joint J is connected in the hose H1,H2 between the buoy B and the tanker T.

The constant motion swivel joint J (FIG. 2) includes an inner or male member 11 connected to a pipe or the hose section H1, and an outer or female member 12 connected to a pipe or the hose section H2. The lower end of the inner member 11 includes a radial flange 13 having an annular groove 17 in the outer portion of the flange. An axial bore 18 extends through the length of the inner member to provide a path for fluid to flow from the hose H2.

The outer member 12 (FIG. 2) includes an enlarged upper portion 16 having an axially extending passage 19 to receive the inner member 11 in position to transfer fluid between the hoses H1 and H2, and an axial bore 23 aligned with the bore 18 of the inner member 11. An annular retaining flange 24 having an axial bore 25 is secured to the upper end of the outer member by a plurality of capscrews 26 each extending through a bore 29 in the flange 24 and mounted in a threaded bore 30 in the outer member 12. An annular upper bushing 31 is mounted in a groove 35 in the flange 24 and is positioned between the outer surface 14 of the inner member and the retaining flange 24. An annular lower bushing 36 is mounted in the groove 17 between an inner wall 20 of the outer member 12 and the flange 13. An annular thrust bearing 37 mounted between the lower end 15 of the inner member and the lower end 19b of the passage 19 supports the inner member 11 and the hose H1.

A plurality of annular sealing discs 41 (FIGS. 2–4) mounted between the flanges 13 and 24 are specially designed to provide long-life fluid-tight seals between the inner and outer joint members 11,12. Each of the sealing discs 41 includes an annular metal ring 42 (FIG. 4) having a low friction coating 43 bonded to one surface, and having a layer of elastomeric material 47, such as rubber, bonded to the other surface of the ring 42. The discs 41 are mounted (FIGS. 2,4) with the rubber coating of one disc pressed against the low-friction coating of an adjacent disc. A special disc 41a, having an elastomeric material 47 on both sides of the ring 42, is positioned nearest the flange 24 (FIG. 2). When the inner member 11 rotates less than approximately 5 degrees away from the "center" position relative to the outer member 12, the rubber in each of the elastomeric layers 47 flexes to accommodate the rotary movement of member 11 without any of the coatings 43 sliding over an adjacent elastomeric member 47. This action greatly reduces surface wear on the sealing discs 41. When the inner member 11 rotates through angles greater than approximately 5 degrees the low-friction surfaces 43 of the discs slide over the elastomeric surfaces 47 of adjacent discs to accommodate larger angles of rotation of the inner member 11.

An 0-ring seal 48 mounted in an annular groove 49 provides a fluid-tight seal between the retaining flange 24 and the upper end of the outer member 12. The amount of compression forces exerted on the sealing discs 41 can be varied by adjusting the position of the capscrews 26 relative to the bottom of the threaded bores 30. Any pressurized fluid entering a space 19a between the discs 41 and the outer member 12 or any pressurized fluid entering a space 19c between the discs 41 and the inner member 11 provides a radial compression of the rubber portion of the discs 41 resulting in an axial expansion of the rubber to provide a tight seal between the flanges 13 and 24. As the pressure of the fluid in these spaces 19a,19c increases, the seal between the members 11,12 becomes tighter.

Another embodiment of the present invention (FIGS. 5,6A,6B) employs a pair of alternately positioned sealing discs 41a,41b. The disc 41b (FIG. 6B) includes a metal ring 42 having a pair of low friction coated surfaces 43 and the disc 41a (FIG. 6A) includes a ring 42 having a pair of surfaces each coated with elastomeric material 47 as discussed above. These discs 41a,41b are alternately positioned, starting with one disc 41a mounted adjacent the flange 13 and ending with another disc 41a mounted adjacent the flange 24 to prevent slippage between the flanges and the adjacent disc for small angles of rotation of the inner member relative to the outer member.

Another embodiment of the constant motion swivel joint J as disclosed in FIG. 7 uses a plurality of conical or belleville discs 59a,59b alternately positioned. The disc 59a (FIG. 7) includes a conical metal ring 61 having a pair of surfaces each coated with an elastomeric material 47 in the same manner as shown in FIG. 6A. The disc 59b includes a conical metal ring 61 having a pair of low friction coated surfaces 43 in the same manner as shown in FIG. 6B. Approximately half of the belleville disc 59a,59b (FIG. 7) have the radially outward edge 62 facing the retaining flange 24a and half have the radially outward edge 62 facing the radial flange 13a. An annular conical disc 60, having a pair of low-friction surfaces 60a,60b, is mounted at the approximate midpoint of the stack of discs 59a,59b and a pair of end discs 59a each having an elastomeric surface 47 on both sides, are mounted adjacent the disc 60 and another pair of end discs 59a are mounted adjacent the radial flanges 13a,24a. The inclined surfaces 64,65 of the flanges 13a,24a press against the belleville discs 59a causing the discs 59a,59b to center themselves about the inner member 11a with approximately equal gaps 66,67 between the discs and the inner and outer members 11a, 12a. This centering action prevents a rotational drag which might result if the discs press against the inner or outer member, as could happen in embodiments using flat sealing discs.

Other embodiments of the sealing discs disclosed in FIGS. 8A–8E include features which reduce extrusion of the elastomeric material and/or improve the sealing characteristics of the sealing discs. A metal ring 42 of FIG. 8A is attached to a serrated elastomeric facing 47a which provides multiple sealing surfaces 52 to improve the sealing characteristics of the disc. An L-shaped metal ring 42a of FIG. 8B reduces the amount of extrusion of the elastomeric material 47b in a radial direction when the discs are pressed tightly together, and the convoluted metal face 53 of a ring 42b of FIG. 8C similarly reduces the radial extrusion of elastomeric material on an adjacent sealing disc. An anti-extrusion ring 54 (FIG. 8D) reduces radial extrusion of the elastomeric material 47 and limits the amount of squeezing of the material 47. The elastomeric material of FIG. 8E is reinforced with fabric to provide an elastomeric coating 58 which is resistant to extrusion.

Another embodiment of the constant motion swivel as disclosed in FIG. 9 is especially adapted for use in an environment where the pressure inside the swivel joint J is different than the pressure outside the swivel joint. The inner member 11b includes a radial flange 13b positioned approximately midway between the retaining flange 24 and the lower end 19b of the axial passage 19 of the outer member 12b, and an approximately equal number of sealing discs 41 are positioned on each side of the radial flange 13b. An annular lower bearing 71 is mounted between the lower portion of the inner member 11b and the outer member 12b, in addition to the bushings 31,36 which were described in the embodiment of FIG. 2.

When the pressure inside the axial bore 18 of the swivel joint J (FIG. 9) is greater than the pressure outside the swivel joint, fluid moves into the spaces 72,73 between the outer and inner members to provide an upward force against the flange 13b thereby compressing the sealing discs between the flanges 13b and 24b. These compressed discs provide a fluid-tight seal and absorb the strain of the upward force on the flange 13b.

When the pressure outside the swivel joint J (FIG. 9) is greater than the pressure inside the swivel joint, fluid moves into the space 74 between the inner and outer members to provide a downward force against the flange 13b thereby compressing the sealing discs between the flange 13b and the lower end 19b of the axial passage 19. These compressed discs provide a fluid-tight seal and absorb the strain of the downward force on the flange 13b. The inner member 11b can be rotated and the elastomeric layers 47 of the sealing disc will deform to absorb the rotation of the inner member relative to the outer member. This is an advantage over the embodiment shown in FIGS. 2 and 5 which include a thrust bearing 37 between the lower end of the inner member 11 and the lower end of the axial chamber 19. When the embodiments of FIGS. 2 and 5 are used in an environment where the outer pressure is greater than the inner pressure of the swivel joint J the inner member will be pressed against the thrust bearing 37 and any rotation of the inner member relative to the outer member will cause excessive wear on the thrust bearing.

Several other embodiments of the constant motion swivel joint disclosed in FIGS. 10A–10I include a joint (FIGS. 10A,10B) having beveled discs between the inner and outer members and another joint (FIG. 10C) having a set of spherical discs between the inner and outer members. The swivel joint disclosed in FIG. 10D is similar to the embodiment shown in FIG. 2 except the radial flange 13 and the lower bushing 36 shown in FIG. 2 have been replaced by an annular replaceable thrust ring 77 which is threaded to the lower end of the inner member 11c. The swivel joint disclosed in FIG. 10E includes an annular L-shaped elastomeric sealing member 78 to seal the gap between the outer surface of the inner member and the retaining flange 24 and to reduce the amount of downward pressure on the radial flange 13 when the pressure outside the swivel joint is greater than the pressure inside the swivel joint.

The swivel joint disclosed in FIG. 10F includes a retaining flange 24e and a radial flange 13e each having a low friction bearing portion 79a,79b connected to the remainder of the flange by elastomeric rings 80a,80b. The elastomeric rings 80a,80b flex to allow small rotational movement of the inner member 11e relative to the outer member 12e without having the bearing portions 79a,79b slide over the surface of the adjacent members 11e,12e. When larger rotational movement of member 11e is experienced the bearing portions 79a,79b each slide over the surface of an adjacent member 11e,12e in the manner of the other embodiments of FIGS. 2-10.

The swivel joint J disclosed in FIG. 10G includes a plurality of ball bearings 84 mounted in a raceway 85 formed in the lower end 15 of the inner member 11 and in the wall 86 of the outer member 12. The swivel joint disclosed in FIGS. 10H,10I include a helical spring 90 and a pair of belleville washers 91 respectively to preload the sealing discs 41 by applying a force between the wall 86 of the outer member and the thrust bearing 37a,37b. The force applied by spring 90 and washer 91 compensates for any wear on the sealing discs 41 and insures a fluid-tight seal between the inner and the outer members 11g,12g and 11h,12h.

The present invention discloses a constant motion swivel joint having a greatly improved useful life over the prior art swivel joints without leakage of fluid from the joints. A plurality of sealing discs each having an elastomeric layer to absorb relatively small oscillations are mounted between an inner and an outer member of the joint. The sealing discs also have a low friction coating which slides over the elastomeric layer to allow for larger angles of rotation between the inner and outer members.

Although the best mode contemplated for carrying out the present invention has been herein shown and described, it will be apparent that modification and variation may be made without departing from what is regarded to be the subject matter of the invention.

What is claimed is:

1. A constant motion swivel joint for connecting two lengths of pipe, said connector comprising:
a generally cylindrical inner member having a bore extending axially therethrough, and having a flange extending radially outward from the outer surface of said inner member;
means for connecting a first length of pipe to communicate with said axial bore of said inner member;
a generally cylindrical outer member having a bore extending axially from a first end thereof through a portion of said outer member, said outer member having an axially extending passage to receive said inner member, said passage extending from a second end of said outer member through a portion of said outer member;
means for connecting a second length of pipe to communicate with said axial bore of said outer member;
a plurality of annular metal rings mounted between an outer wall of said inner member and an inner wall of said outer member, each of said rings having a low friction coating on one side thereof and a layer of elastomeric material bonded to the other side, said metal rings reducing extrusion of said bonded elastomeric material under pressure and said elastomeric material flexing to accommodate a predetermined amount of rotary motion between said inner and said outer members without slippage between adjacent annular rings; and
means for compressing said rings between said radial flange of said inner member and a portion of said outer member to provide a fluid-tight seal between said inner and said outer members.

2. A constant motion swivel joint as defined in claim 1 wherein said annular rings each include a metal disc having a low friction coating on one side of said disc and having a layer of rubber bonded to the other side of said disc, each of said metal discs being positioned with the low friction coating of one disc against the rubber layer of an adjacent disc wherein the flexing of said rubber layers allows a predetemined amount of rotation of said inner member relative to said outer member without slippage between adjacent annular rings, and said low friction coating allows slippage between adjacent annular rings when rotation of said inner member exceeds said predetermined amount.

3. A constant motion swivel joint as defined in claim 1 wherein said radial outward flange is connected to an end portion of said inner member, said outward flange being mounted in an inner end of said passage, said joint including a radial inward flange connected to said second end of said outer member to enclose an outer end of said passage, and means for mounting said annular rings between said inward and said outward flanges.

4. A constant motion swivel joint as defined in claim 1 wherein said radial outward flange is connected to a mid portion of said inner member, said outward flange being mounted along the mid portion of said passage, said joint including a radial inward flange connected to said second end of said outer member to enclose an outer end of said passage, means for mounting a first plurality of said annular rings between said outward flange and said inward flange, and means for mounting a second plurality of said annular rings between said outward flange and an inner end of said passage.

5. A constant motion swivel joint as defined in claim 1 including a second type of ring, said second ring having a layer of elastomeric material bonded to each side of said second ring, said second ring being mounted between said radial flange and a low friction coating of one of said annular rings.

6. A constant motion swivel joint as defined in claim 1 wherein said annular rings are mounted with an elastomeric layer of one ring juxtaposed a low friction coating of an adjacent ring.

7. A constant motion swivel joint as defined in claim 1 wherein said elastomeric layer includes a fabric reinforcement to resist extrusion of the material in said layer when said rings are compressed.

8. A constant motion swivel joint as defined in claim 1 wherein said elastomeric layer includes a plurality of serrations to provide multiple sealing surfaces.

9. A constant motion swivel joint as defined in claim 1 wherein each of said rings includes a convoluted low friction surface juxtaposed said elastomeric layer of an adjacent ring to reduce extrusion of said elastomeric layer when said rings are compressed.

10. A constant motion swivel joint as defined in claim 1 wherein each of said rings has a conical shape, said radial flange of said inner member and said portion of said outer member having complementary conical shapes causing said compression means to center said conical rings between said inner and said outer members.

11. A constant motion swivel joint for connecting two lengths of pipe, said connector comprising:
 a generally cylindrical inner member having a bore extending axially therethrough, and having a flange extending radially outward from the outer surface of said inner member;
 means for connecting a first length of pipe to communicate with said axial bore of said inner member;
 an outer member having a bore extending axially from a first end thereof through a portion of said outer member, said outer member having an axially extending passage to receive said inner member, said passage extending from a second end of said outer member to communicate with said axial bore;
 means for connecting a second length of pipe to communicate with said axial bore of said outer member;
 a plurality of annular metal rings mounted in said passage between an outer wall of said inner member and a wall of said passage, said rings being divided into first and second groups, said rings in said first group having a low friction coating on both sides thereof, said rings in said second group having a layer of elastomeric material bonded to both sides thereof, rings from said first group being alternately positioned between rings from said second group, said metal rings in said second group reducing extrusion of said bonded elastomeric material under pressure and said elastomeric material flexing to accommodate a predetermined amount of rotary motion between said inner and said outer members without slippage between adjacent annular rings; and
 means for compressing rings between said radial flange of said inner member and a portion of said outer member to provide a fluid-tight seal between said inner and said outer members.

12. A constant motion swivel joint as defined in claim 11 wherein said low friction coating on said rings in said first group allows slippage between adjacent annular rings when rotation of said inner member relative to said outer member exceeds said predetermined amount.

* * * * *